United States Patent [19]

Uberbacher

[11] 4,151,535
[45] Apr. 24, 1979

[54] ELECTRO-EROSION HEAD AND MANUFACTURING METHOD

[75] Inventor: Edward C. Uberbacher, Raleigh, N.C.

[73] Assignee: International Business Machines Corporation, Armonk, N.Y.

[21] Appl. No.: 832,133

[22] Filed: Sep. 12, 1977

[51] Int. Cl.$^2$ ............................................. G01D 15/08
[52] U.S. Cl. ................................. 346/139 C; 346/163; 29/592 R
[58] Field of Search ................. 346/139 C, 155, 162, 346/163, 164; 29/592, 628; 427/96

[56] References Cited

U.S. PATENT DOCUMENTS

| | | | |
|---|---|---|---|
| 3,396,457 | 8/1968 | Nordin | 29/592 |
| 3,756,852 | 9/1973 | Scheetz et al. | 427/96 |
| 3,955,204 | 5/1976 | Anton | 29/592 |
| 3,961,336 | 6/1976 | Walker et al. | 346/162 |
| 4,052,714 | 10/1977 | Peterson | 346/155 |

Primary Examiner—Lowell A. Larson
Attorney, Agent, or Firm—Harold H. Sweeney, Jr.

[57] ABSTRACT

An electro-erosion head is provided which is formed from thin sheets of electrically conductive material. Each thin sheet of electrically conductive material has at least one narrow extension extending from an edge thereof to form an electrode. A connector tab extends from another edge thereof. Each sheet is coated with a thin covering of an insulative material except in the area of the connector tab which is tin-lead coated for eventual soldering. The sheets are stacked to form a laminated head and are encapsulated in a plastic-like material which is ground down at the ends of the electrodes so that they are exposed so as to be able to complete the electrical path therefrom and perform the electro-erosion function. The electrodes are located at the same location on each of said sheets so that when stacked they form a column of electrodes each capable of forming a spot in the electro-erosion process. The connector tabs are spaced from one another at the other edge of the sheets so as to make each connector tab available for a solder connection and thus give the required connection fanout.

9 Claims, 9 Drawing Figures

ELECTRO-EROSION HEAD AND MANUFACTURING METHOD

BACKGROUND OF THE INVENTION

1. Statement of the Invention

The invention relates to an electro-erosion print head and method for making such a head and, more particularly, to an electro-erosion print head and method of manufacture in which the electro-erosion print head is made of laminated sheets of conductive material having a predetermined head redundancy and the required fanout.

2. Description of the Prior Art

Electro-erosion print heads have generally been made utilizing printed circuit technique. This technique requires artwork for establishing the closely spaced electrically conductive lines forming the electrodes. These electrodes are usually formed near the edge of a circuit card or board from which the electrical connections can be made. There are certain limitations introduced by the artwork which limits the density of the electrodes. Accordingly, a means is needed for overcoming the density limitations introduced by the required artwork.

SUMMARY OF THE INVENTION

It is the main object of the present invention to provide an electro-erosion head formed of laminated sheets which can be closely spaced with respect to one another thereby improving the head electrode density.

It is another object of the present invention to provide an electro-erosion head in which redundant heads are provided without increasing the manufacturing cost.

It is a further object of the present invention to provide a laminated electro-erosion print head in which any practical connector fanout can be obtained by the proper locating of the connector tabs.

Briefly, the invention consists of a laminated electro-erosion print head formed of a plurality of insulated sheets of thin electrical conductive material having at least one electrode extending from an edge thereof and having a connector tab extending from an opposite edge thereof. The sheets are coated with an insulator except in the area of the connector tabs and are stacked to form the laminated head. The arrangement is encapsulated and the end thereof adjacent the end of the electrodes is ground down so that the electrodes are exposed so as to provide the electro-erosion function.

DESCRIPTION OF THE PREFERRED EMBODIMENTS

Figure 1:
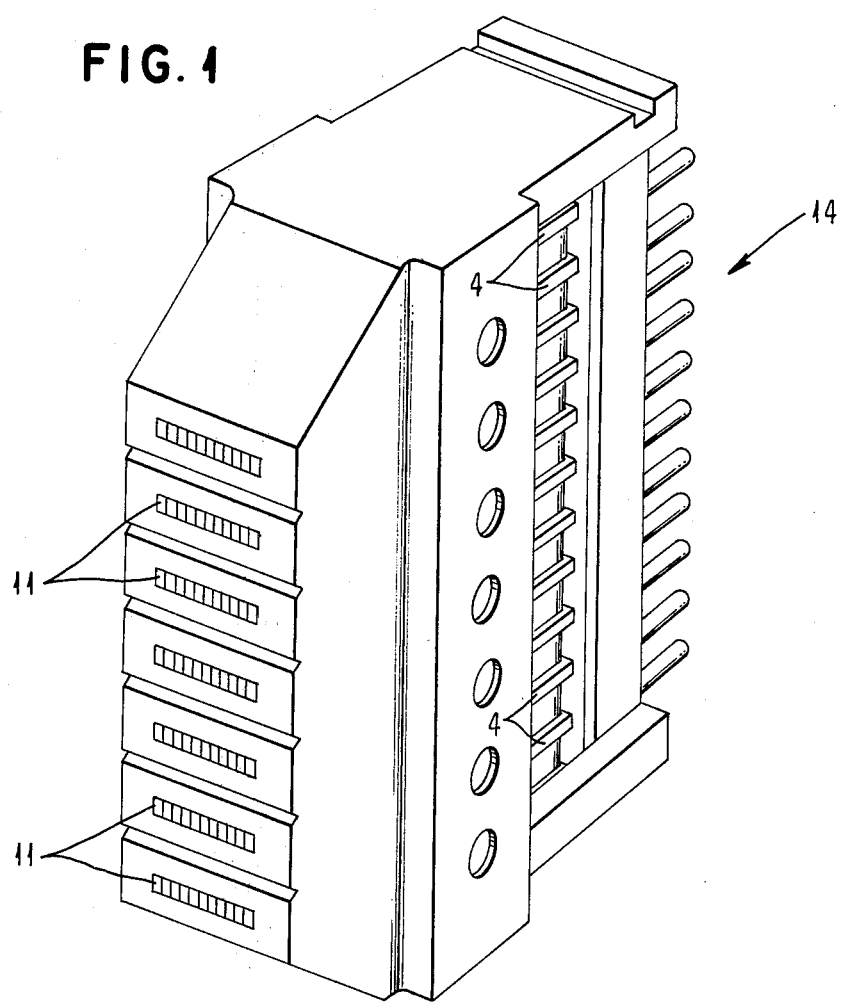
FIG. 1 is a schematic diagram showing seven multi-position electro-erosion heads and the respective output connection means.

Referring to FIG. 1 there is shown a schematic diagram of an electro-erosion print head having seven head electrode arrays 11 arranged adjacent one another. Six of the seven heads are redundant and are switched into print position when needed, for example, when the primary head becomes worn or where the redundant heads are of a different size to, therefore, obtain different printing characteristics. Each head is shown as containing an array of electrodes, with each electrode having a connector tab 4 output arranged so as to connect to a pin output connector 14. Of course, the head array is not limited to any set number of electrodes but can contain as few or as many electrodes as the use to which it is to be put dictates. Very often the number of electrodes and, thus, the head size is determined by the connector 14 to which it is to be connected. The manufacturing process utilized maintains the head manufacturing at low cost and the multiple set of heads costs practically the same for manufacture for seven or more heads as for one head.

Figure 2:
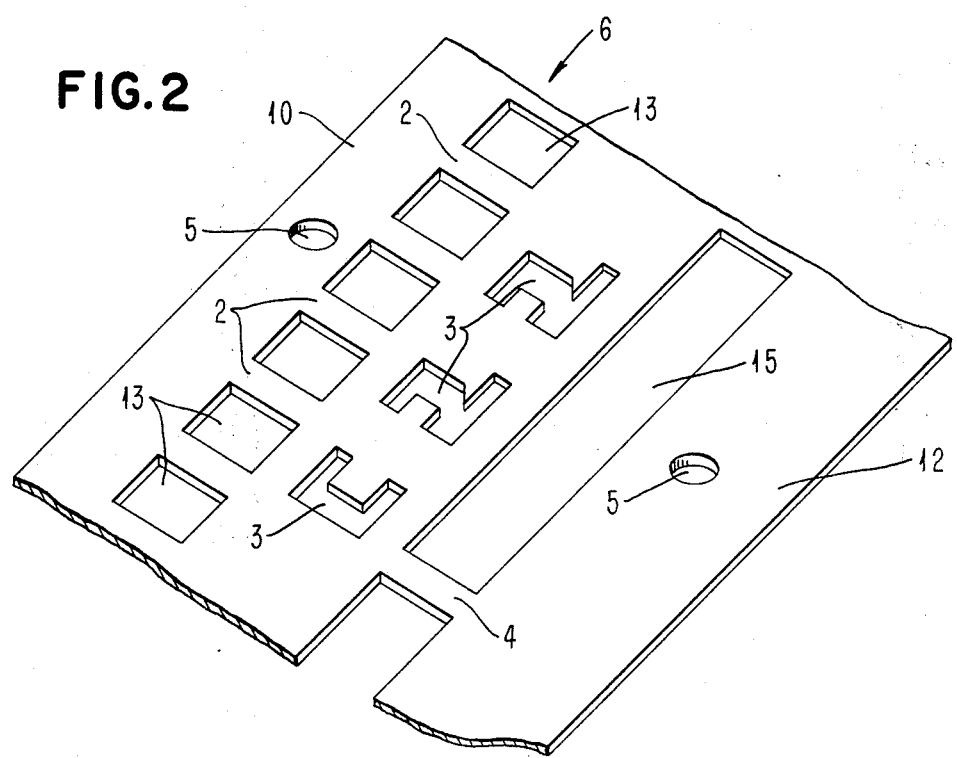
FIG. 2 is a schematic representation showing one of the electrically conductive thin sheets of material utilized in forming the laminated electro-erosion head.

The basic building block 6 of the electrode assembly or head is shown in FIG. 2. A carrier salvage strip 10 is attached at the end of the electrodes 2. A further salvage strip 12 is connected at the end of connector tabs 4. These salvage strips are utilized to provide the thin sheets of material 6, such as steel, with strength and stability and to facilitate the manufacturing process. For example, the salvage strips 10 and 12 each contain openings 5 by means of which the sheets 6 of material are stacked during the manufacturing process on a separate fixture. The electro-erosion head configuration is stamped from the sheet material or it may be chemically milled. The row of square openings 13 are utilized to produce the seven electrodes 2. The electrodes 2 consist of the material which separates the square openings 13. It should be appreciated that the electrode 2 widths can be easily varied by controlling the dimensions of the square openings or cutouts 13. The connector tab 4 is similarly provided by the remaining sheet material in conjunction with cutout portions 15. By proper dimensioning of the cutout portions 15, the connector tab 4 can be located where desired. In actual manufacture, each electro-erosion electrode lamina configuration is stamped from a long sheet of the material and the openings 15 controlling the position of the connector tab 4 can be progressively varied giving a different position for the tab 4 for each head electrode sheet 6. The code cutout 3 in the center of the electrode sheet 6 can be used for identification but is mainly to assist in the potting or encapsulation of the laminated head.

Figure 3:
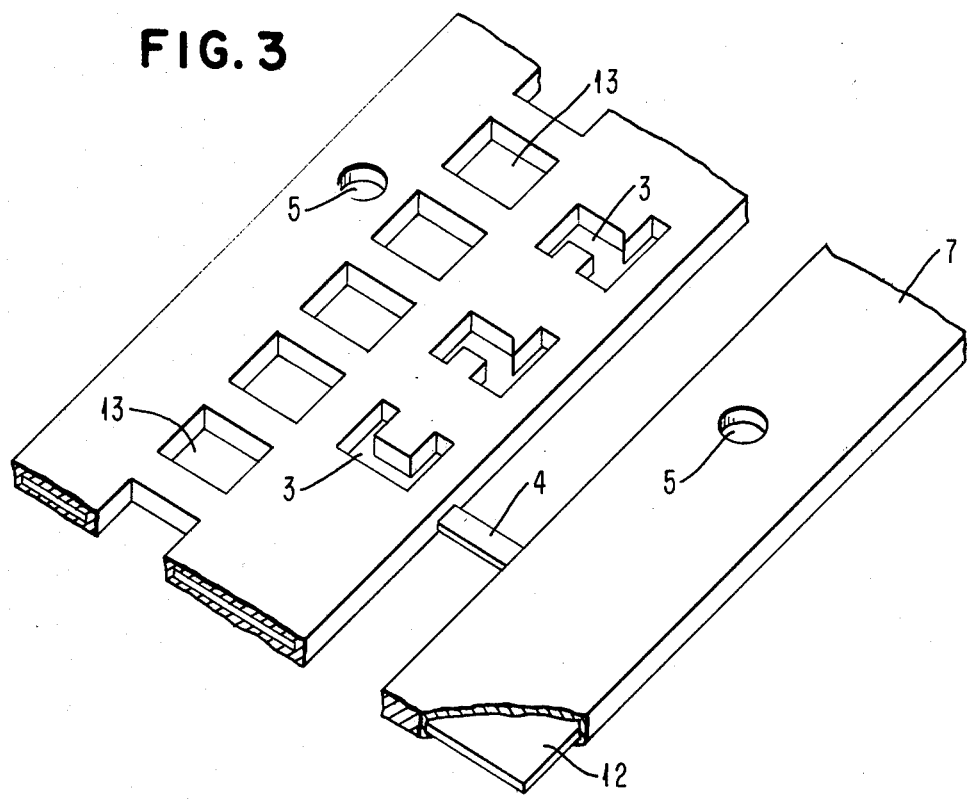
FIG. 3 is a schematic representation of one of the electrically conductive thin sheets having a thin insulative selective coating thereon.

FIG. 3 shows one of the electrically conductive thin conductive electrode sheets 6 selectively coated with insulation 7 such as plastic. The sheet material 6 is formed from 0.5 mil stock (0.0005 inches). Before coating with a 0.5 mil insulation, a resist is placed over the contact tab 4. The insulation coating 7 on the sheet material 6 can be electrofluoridically applied. After the resist has been removed from the connector tab 4, it is tin-lead plated in preparation for connector attachment by soldering.

Figure 4:
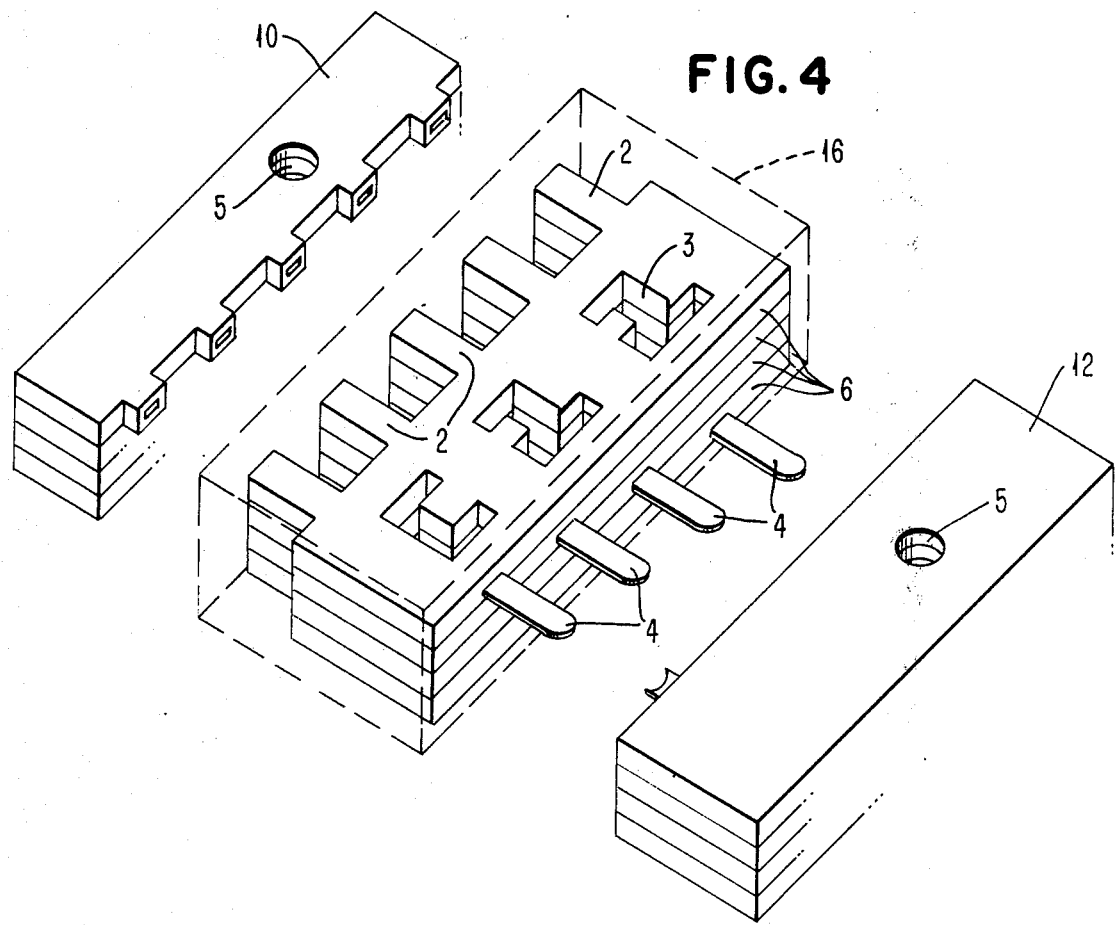
FIG. 4 is a schematic representation of an electro-erosion head after stacking, potting and removal of salvage.

The insulated thin sheets 6 of electrically conductive material are stacked utilizing the holes 5 for alignment purposes on an appropriate fixture or the like until the required number of electrodes 2 are included in the head. The stack of sheets is shown in FIG. 4. Once stacked the laminae is encapsulated as a unit in a plastic-like potting compound 16. Once the potting is completed the salvage 10 and 12 is cut away at the ends of the electrodes 2 and at the ends of the connector tabs 4, respectively. It should be noted that the encapsulation does not include the connector tabs 4 but does include the electrodes 2. The next step in the manufacture of the head is the grinding down of the potting compound surface containing the electrode ends. The grinding is stopped once the electrode 2 ends are exposed. A stack of four sheets or laminae is shown in FIG. 4. It will be appreciated that the required number of insulated sheets 6 can be stacked and potted depending on the required number of electrodes 2 in the head. Tabs 4 are shown having a different location for each of the lamina 6. Accordingly, when the lamina 6 are stacked each of the connector tabs 4 are sufficiently spaced from one another to provide the required space for connection thereto.

Figure 5:
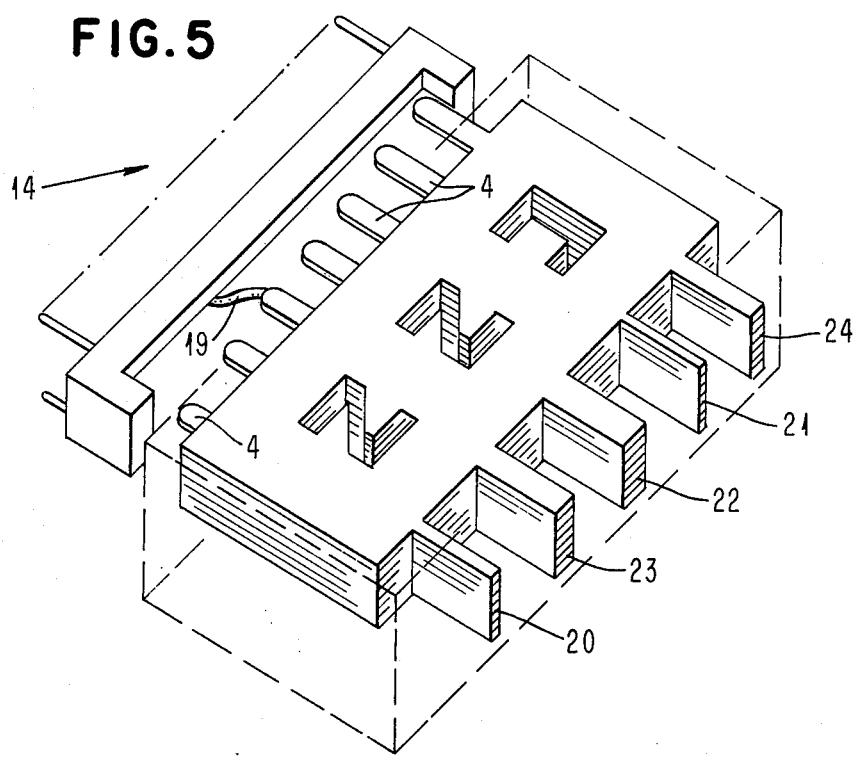
FIG. 5 is a further schematic representation of an electro-erosion head showing different head widths and the fanout connections to a further connector.

FIG. 5 shows the view of the electro-erosion print head in which the electrodes in respective heads are shown having a different width, thereby providing a different printing size hole in accordance with the head selection. For example, head 22 is the widest, head 23 is not quite as wide and head 24 is narrower. Head 21 is the narrowest and head 20 is between the widths of heads 21 and 24. It has been found that locating a column of electrodes of thinner width between columns of thicker widths reduces the damage during manufacture. FIG. 5 also shows the connector tabs 4 connected to a connector 14 by solder attachment 19. The important thing with respect to the connector tab 4 is that they be spaced from one another sufficiently to make a solder connection thereto. This fanout can be produced to be compatible with the particular connector 14 being used.

Figure 6:
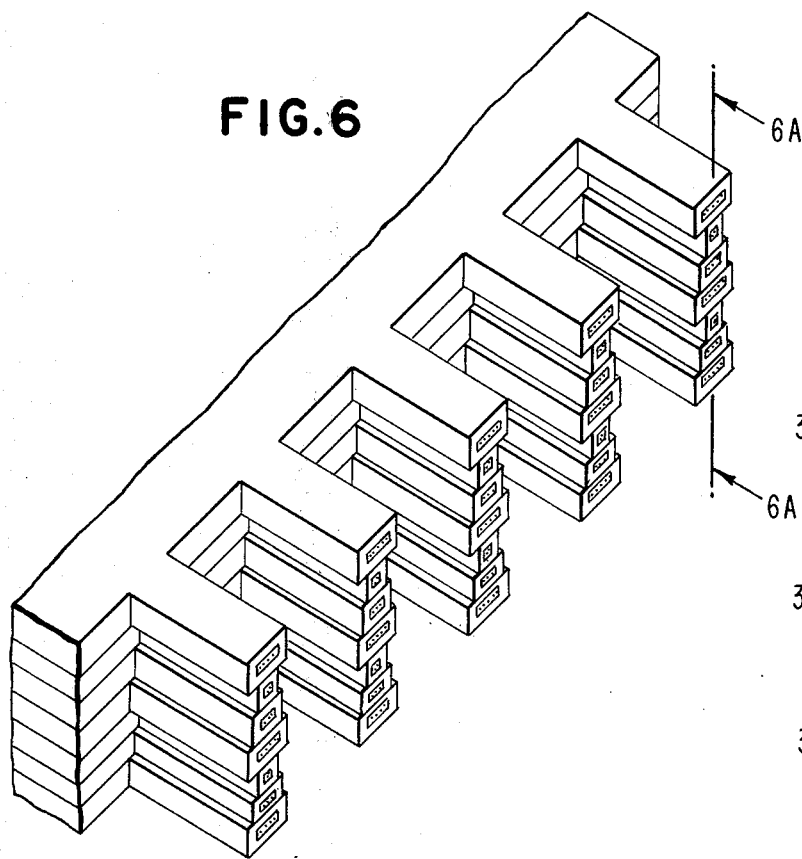
FIG. 6 is a further schematic representation of the electrodes in an electro-erosion print head having various electrode selection capabilities per head and having different width electrodes per head.
Figure 6A:
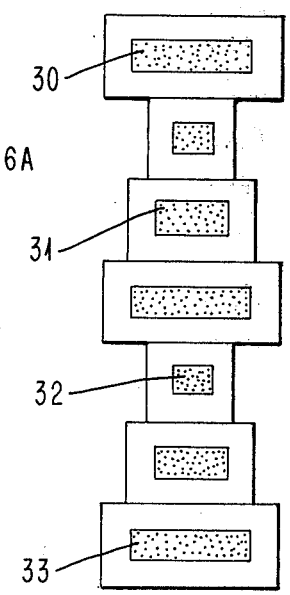
FIG. 6a is a blown up view taken along line 6a—6a of FIG. 6 indicating by reference numerals an alternate selection of electrodes.

FIG. 6 shows the potted electro-erosion head in which the electrodes within a head column are selectable as indicated in FIG. 6a. For example, every other electrode 30, 31, 32 and 33 are selected, thus giving a head printout having a smaller spot density which requires less computer storage space and which is also faster to produce. Of course, any predetermined selection combination can be obtained. FIG. 6a which is a face view of one of the electrode heads, also shows different width electrodes within the head. Such an arrangement of various width electrodes within the same head produces gray tones.

Figure 7:
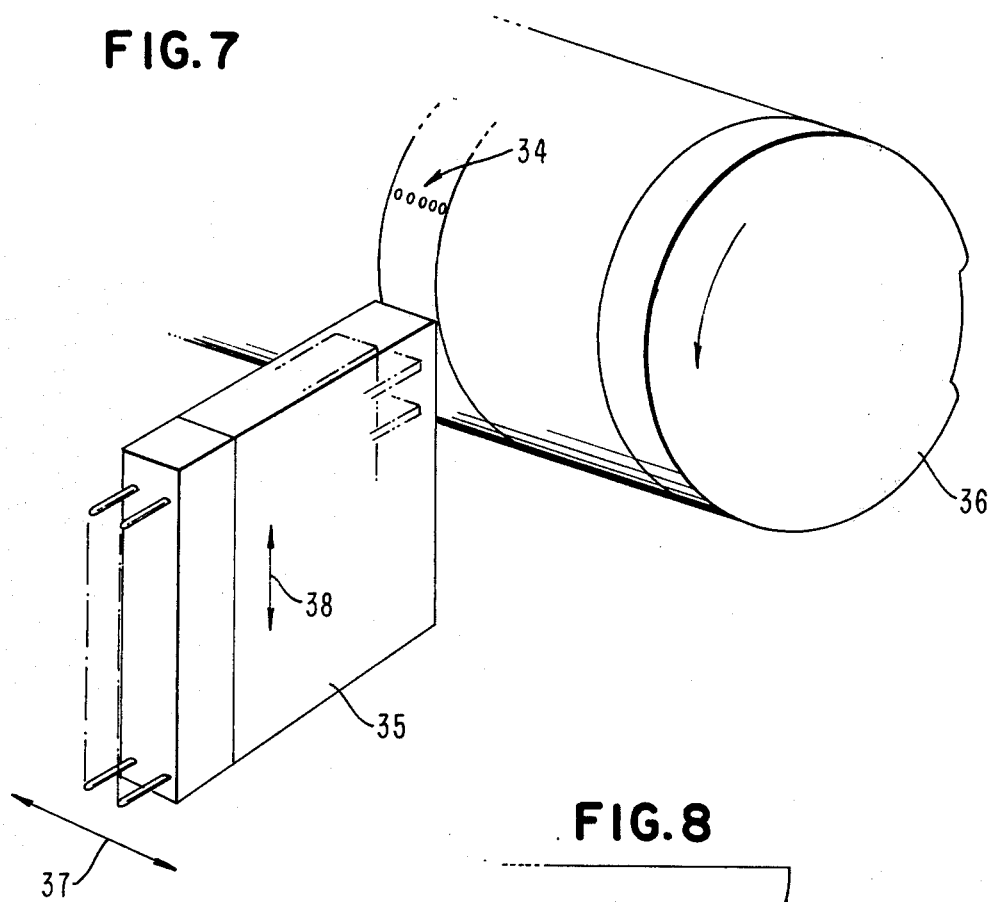
FIG. 7 is a schematic representation showing the electro-erosion print head in operational arrangement.

FIG. 7 is a schematic representation showing the completed electro-erosion print head operating in conjunction with a rotating drum 36. As the drum rotates the head that is in operation at the time produces the image 34 on the paper which is on the drum. The erosion head assembly 35 is adapted for horizontal movement in conjunction with the printing as indicated by horizontal arrows 37. Also, the assembly 35 has an indexable vertical head movement to bring another head into print position as indicated by arrows 38.

Figure 8:
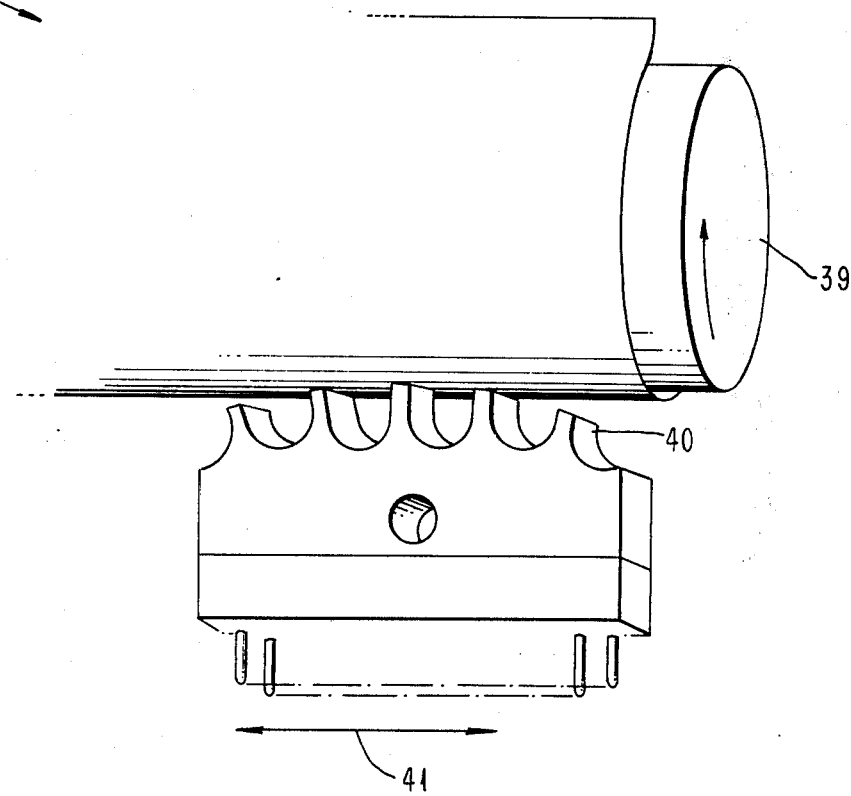
FIG. 8 is a schematic representation of an alternate operational arrangement of the electro-erosion print head in conjunction with a typewriter platen or drum.

FIG. 8 shows an alternate operational arrangement of the electro-erosion printing head in conjunction with a paper carrying platen or drum 39. In this arrangement the printing head arrays are located along a curved surface 40 such that they can be selected by rotating the head until the desired head is in print position. The head is arranged to move horizontally as indicated by the arrows 41 while the platen or drum 39 can be indexed to obtain the desired paper movement.

While the invention has been particularly shown and described with reference to the preferred embodiments thereof, it will be understood by those skilled in the art that the various changes in form and detail may be made therein without departing from the spirit and scope of the invention.

I claim:

1. An electro-erosion print head comprising;
   a plurality of electrically conductive thin sheets of material having a predetermined shape;
   a plurality of electro-erosion electrodes formed in and extending from an edge of said thin sheet of material;
   a connector tab formed in and extending from another edge of said sheet of material;
   a thin coating of insulating material covering each of said sheets except for said connector tabs;
   each of said sheets of material having holes therein for stacking, the electrodes on each sheet being located at the same location along the same edge of said sheets so as to form a multi-electrode head;
   said connector tabs being located at different positions along said respective sheet edge to obtain the predetermined spacing for the predetermined connector fanout;
   an encapsulating material surrounding said sheets thereby forming an unitary structure;
   the ends of said electrodes having said encapsulating material removed so as to provide high density electrical discharge paths therefrom through which said electro-erosion printing function can be performed.

2. An electro-erosion print head according to claim 1, wherein said plurality of electrically conductive thin sheets of material having a predetermined shape contain a pair of salvage strips to add structural stability, said electro-erosion electrodes extending from one edge of said sheet to one of said salvage strips and the connector tab extending from the other edge of said sheet to said second salvage strip.

3. An electro-erosion print head according to claim 1, wherein said electro-erosion electrodes formed in and extending from an edge of said thin sheet of material are spaced sufficiently from one another along the edge so that they form redundant heads with similarly spaced electrodes when said thin sheets are stacked.

4. An electro-erosion pring head according to claim 3, wherein said electro-erosion electrodes formed in and extending from an edge of said thin sheet of material are of different predetermined widths so as to form redundant head when said thin sheets are stacked which give dots of a size corresponding to width.

5. An electro-erosion print head according to claim 1, wherein the corresponding one of said electro-erosion electrodes on respective thin sheets of material have varied widths so that a head array of different width electrodes results and a predetermined selection can be made thereby providing a selectable printout characteristic.

6. An electro-erosion print head according to claim 1, wherein said connector tab is located the maximum distance and equidistance along the edge from the adjacent connector tab so that each connector tab has the maximum amount of space for making an electrical connection thereto.

7. An electro-erosion print head according to claim 1, wherein each thin sheet of material forming said head includes the same identification cutout at the same location therein so that thru bonding ports are formed to aid in said encapsulation.

8. A method of manufacturing an electro-erosion print head comprising the steps of;

forming a lamina from a thin sheet of electrically conductive material which has openings located therein defining electrodes therebetween extending from one edge thereof and having further openings defining a connector tab therebetween extending from another edge thereof, the size of said further holes defining the position of said connector tab along an edge of said lamina, said lamina having salvage strips formed therein at the outer end of said electrodes and the outer end of said connector tab;

coating the connector tab with resist;

coating the lamina with a thin coating of insulation material;

removing the resist from the connector tab;

tin lead coating the connector tab;

stacking the lamina so as to align the electrodes into head arrays;

encapsulating the stack with a plastic-like potting compound;

cutting the salvage strips away at the ends of the electrodes and connector tab.

9. A method of manufacturing an electro-erosion print head according to claim 8, including the further steps of grinding the encapsulation material down at the end of the electrodes to uncover the electrodes and ensure good electrical conductivity in printing, and soldering the connector tabs to external connectors.

* * * * *